United States Patent [19]

Krueger et al.

[11] Patent Number: 4,875,220
[45] Date of Patent: Oct. 17, 1989

[54] LASER TUBE FOR POLARIZED LASER EMISSION

[75] Inventors: Hans Krueger, Munich; Wolfgang Welsch, Baldham, both of Fed. Rep. of Germany

[73] Assignee: Siemens Aktiengesellschaft, Berlin and Munich, Fed. Rep. of Germany

[21] Appl. No.: 265,923

[22] Filed: Nov. 2, 1988

[30] Foreign Application Priority Data

Nov. 5, 1987 [DE] Fed. Rep. of Germany ....... 3737624

[51] Int. Cl.$^4$ ............... H01S 3/08; H01S 3/22; H01S 3/03
[52] U.S. Cl. .................. 372/107; 372/27; 372/55; 372/61; 372/106
[58] Field of Search ........... 372/107, 108, 106, 99, 372/27, 55, 56, 61

[56] References Cited

U.S. PATENT DOCUMENTS

| | | | |
|---|---|---|---|
| 4,009,933 | 3/1977 | Firester | 350/152 |
| 4,081,762 | 3/1978 | Golser et al. | 372/55 |
| 4,084,883 | 4/1978 | Eastman et al. | 372/106 |
| 4,187,474 | 2/1980 | Hug et al. | 372/56 |
| 4,250,467 | 2/1981 | Kubota et al. | 372/55 |
| 4,615,034 | 9/1986 | von Gunten et al. | 372/99 |

FOREIGN PATENT DOCUMENTS

| | | |
|---|---|---|
| 2828143 | 2/1979 | Fed. Rep. of Germany . |
| 2015812 | 9/1979 | United Kingdom . |
| 2177814 | 1/1987 | United Kingdom . |

OTHER PUBLICATIONS

Patent Abstracts of Japan, vol. 10, No. 61, (E-387), [2118] Mar. 11, 1986, "Laser Oscillator".

Primary Examiner—William L. Sikes
Assistant Examiner—Georgia Y. Epps
Attorney, Agent, or Firm—Hill, Van Santen, Steadman & Simpson

[57] ABSTRACT

A laser tube having two integrated laser mirrors and a polarization mean in the form of at least one polarizing layer arranged on a laser mirror. The layer is applied or formed at an angle of at least 80 degrees to a surface normal of the mirror. As a result, special polarization elements are eliminated, the structure is simplified, and the laser emission yield is increased.

19 Claims, 1 Drawing Sheet

LASER TUBE FOR POLARIZED LASER EMISSION

BACKGROUND OF THE INVENTION

1. Field of the Invention

The present invention is related generally to a laser tube having two integrated laser mirrors and at least one polarizing means.

2. Description of the Related Art

A laser tube is disclosed in German Published Application No. 28 28 143 which includes a Brewster window arranged in the laser for polarization of the laser light. A vacuum tight closure of the laser is provided by the laser mirrors.

A German Published Application No. 25 06 707 discloses mirror members joined to mirror mounts in hermetically tight fashion via glass solder in a laser.

SUMMARY OF THE INVENTION

An object of the present invention is to simplify the structure and increase the efficiency in laser tubes provided with integrated lasers mirrors.

This and other objects are achieved by including at least one polarizing means for polarizing the laser emission of the laser, the polarizing means comprising at least one polarizing layer arranged on one of the laser mirrors.

A polarization layer on the laser mirror eliminates the need for a separate polarization means and simultaneously improves the efficiency of the lasers since a partially reflecting surface in the beam path is eliminated. Optically uniaxial layers such as, for example, layers which are ion etched in a defined direction or directed polymer layers can be utilized as the polarizing layers. The polarizing layer is formed especially advantageously in that at least one of the mirror layers is vapor deposited obliquely relative to the surface normal of the mirror. The obliquely angled, vapor deposited, mirror layer is advantageously vapor deposited at an angle of at least 80 degrees to the surface normal. Such embodiment completely avoids the requirement of an additional layer since the mirror layer itself fulfills the additional job of polarization. Furthermore, dissipation of power is held to a minimum with this embodiment. The obliquely vapor deposited layer can be manufactured in easily reproducable fashion and with high precision. The present invention is particularly advantageously used in gas laser oscillators which have a gain of only slightly better than one for each passage of the laser light, for example, for HeNe laser tubes.

It is advantageous for the assembly and for the employment of the laser when the mirror that is provided with a polarizing layer has a quadrilateral mirror surface so that the polarization direction is identified by the mirror shape. A rectangular shape is particularly suitable for the polarizing mirrors. The polarization direction is expediently aligned parallel to either a short or a long edge of the rectangular mirror. It can be easily realized that the laser mirrors may be cut from a larger mother mirror.

The mirrors are advantageously soldered to a mirror mount at the end face of the laser tube and can thereby project beyond the mount. The shape and size of the mirror is, thus, not subject to any special tolerance demands.

In the standard laser mirror arrangement having a fully reflecting and a partially transmitting mirror, it is advantageous that the fully reflecting mirror carries the polarizing layer and has its backside soldered to a metal plate. The metal plate is then advantageously joined to the remaining parts of the laser housing in vacuum tight fashion to fix the mirror at the inside of the housing. In this case, the mirror is preferrably smaller than the opening of the mirror mount and is inserted into the latter so that the metal plate can be soldered onto the mount. Thus, the mirror is formed especially small which is economical in terms of materials.

Another beneficial embodiment has a mirror that includes a solder region coated with solderable metal, the solder region leaving free a beam passage region. The solder region is soldered to the end face of a mirror mount. The mirror mount is thereby advantageously composed essentially of a drawn copper tube. The ductility of the copper suffices to compensate for stresses which arise due to temperature fluctuations even if its coefficient of temperature expansion is not matched to that of the mirror glass.

DESCRIPTION OF THE PREFERRED EMBODIMENTS

Figure 1:
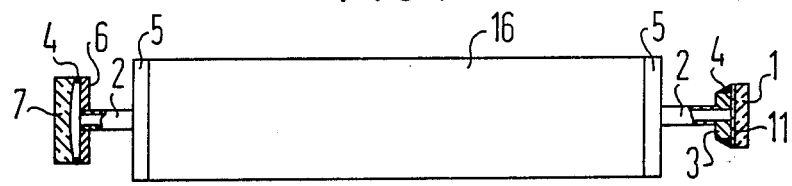
FIG. 1 is a side elevational view, partially in cross section, of an exemplary embodiment of a gas laser according to the principles of the present invention.

A housing for a gas laser including a planar mirror, reference numeral 1, is shown in FIG. 1, the mirror 1 being provided with a polarizing layer 11. The mirror 1 is joined to a metal flange 3 in vacuum tight fashion by glass solder 4 and the metal flange 3 is soldered to a metal tube 2, the metal tube 2 in turn being joined to a metallic face plate 5 of a laser tube 16 of the housing for the gas laser in vacuum tight fashion. Only the face plate 5 needs to be composed of a metal whose coefficient of thermal expansion is matched to that of the laser tube 16, which is composed of a glass or ceramic material. The remaining metal parts, including the metal tube 2 and the metal flange 3, may be composed of an arbitrary metal such as steel or copper. Thermal stresses which occur in the metal parts are intercepted by the glass solder 4.

At the opposite end of the laser tube 16, a face plate 5, a metal tube 2, and a carrier plate 6 are connected, the carrier plate 6 carrying a concave mirror 7. The concave mirror is joined to the carrier plate 6 in vacuum tight fashion via glass solder 4. The concave mirror 7 may either be a non-polarizing mirror or may likewise carry a polarizing layer (not shown). The disclosed laser housing is, of course, for use with the known arrangements of electrodes, power supplies, optics, cooling means, etc. to generate a laser emission.

Figure 2:
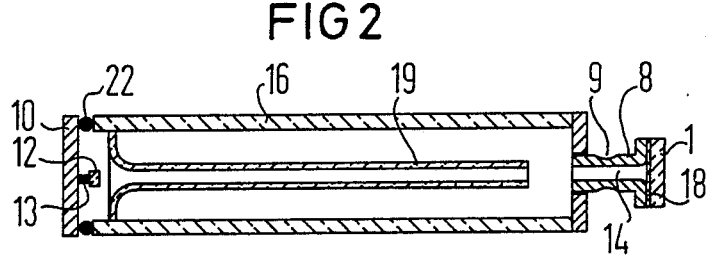
FIG. 2 is a longitudinal cross section of a further exemplary embodiment of the invention.

With reference to FIG. 2, a further embodiment of a gas laser tube is shown in cross section having the mirror 1 mounted at a first end and a mirror 12 mounted at an opposite end. In the second embodiment, one of the two mirrors 1 or 12 is provided with a polarizing layer. The mirror 1 is soldered onto the end face of a drawn metal tube 8 which includes a flange-like expansion in an outward direction at its far end. To form a solder connection, the mirror 1 is coated with a solderable material a its edge regions 18 and is then joined to the metal tube 8 vacuum-tight with a soft solder. The drawn metal tube 8 includes a taper, or reduction, 9 in its cross section which enables topically limited bending of the metal tube 8 and, thus, adjustment of the angle of inclination of the mirror 1 to achieve maximum laser power by proper mirror alignment.

The mirror 1 is mirrored in a partially transmitting fashion. The solderable metal layer arranged at the edge region 18 of the mirror 1 has an area which is free of solder in the region of an inside diameter 14 of the metal tube 8 so that the laser beam impinges this area of the mirror 1.

The fully reflecting mirror 12 is mechanically fixed to an end plate 10, such of metal, with a solder layer 13 preferrably composed of a glass solder. The end plate 10 is joined to the housing 16 in vacuum tight fashion by a ring 22 of glass solder. The mirror 12 has a mirroring surface which is smaller than the cross section of a laser capillary 19 mounted within the laser tube 16, and thus defines the beam diameter and the beam shape. The mirror 12 may be formed as a concave mirror.

Figure 3:
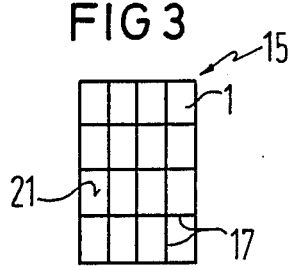
FIG. 3 is a plan view of a mother mirror marked with division lines for dividing into individual laser mirrors.

In FIG. 3 is shown a mother mirror 15 which after being mirrored is divided along dividing lines 16 and 17 to form a plurality of laser mirrors 1. The mother mirror 15 is provided with a surface-wide polarizing layer on its surface 21. Mass production of the polarizing laser mirrors is, thus, possible by forming the mother mirrors 15.

Figure 4:
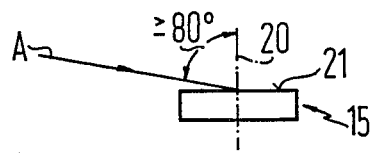
FIG. 4 is a side elevational view of the mother mirror of FIG. 3 showing an oblique vapor deposition thereon.

The mother mirror 15 is also shown in FIG. 4 with a layer being obliquely vapor deposited on the surface 21 in the direction of the arrow A. The layer, thus, formed represents both a mirror layer as well as a polarizing layer according to the present invention. A plurality of mirror layers of an interference mirror is vapor deposited from the same vapor deposition direction A. The polarizing effect is intensified as a result thereof. The vapor deposition direction A advantageously describes an angle of at least approximately 80 degrees relative to a normal 20 to the surface 21 of the mother mirror 16.

Both metallic as well as dielectric layers can be utilized as polarizing layers on the surface 21. For metallic layers, the layer thickness is preferrably below 10 nanometers. This layer thickness is sufficient to prevent inadequate damping of a first oscillation component of the E-vector (electrical field vector) of, for example, an HeNe laser so that only second oscillation component perpendicular to the first is intensified. The metal layer may lie in a thickness range of 2 through 10 nm and be separated into a strip pattern by ion etching at an angle of at least 80°. Advantageous and preferred metal layer materials are silver, gold and aluminum.

Materials which are particularly suitable for use as dielectric layers include $SiO_2$, $Al_2O_3$, $TiO_2O_3$. The layer thickness thereof advantageously amounts to $\lambda/2$ of the desired laser wavelength. Wave shaped strips which are roughly parallel to one another are formed by the oblique vapor deposition, their spacings and their positions producing interferences that lead to attenuation and/or suppression of the oscillation direction of the E-vector.

It is possible to achieve polarization by oblique vapor-deposition of dichroitic layers. The obliquely vapor deposited dichroitic layers that are, for example, composed of tourmaline absorb oscillations in the direction of the E-vector and thereby effect polarization. In one example, the dichroitic layers have a thickness of approximately between 2 and 10 nm.

Instead of oblique vapor-deposition, ion etching of the mirror surfaces can also be used whereby the ion beam is directed onto the mother mirror 15 in the direction of the arrow A to form a groove pattern. Wave-shaped surface deformations that are parallel to one another are thereby produced, which exhibits an effect that is similar to that achieved by obliquely vapor deposited strips. The mirror surfaces themselves are etched, to an etching depth of about $\lambda/2$ of the desired laser emission wavelength. The mirror surfaces, however, can also be provided with a conductive coat that is about 2 nanometers through 19 nanometers thick, whereby it is adequate to etch through this conductive layer.

A photolithographic structuring of metal layers that are applied to the mirror is also suitable for a polarizing layer, particularly for infrared laser emission. Such layers preferably having a line spacing on an order of magnitude of the desired laser wavelength.

Thus, there is shown and described a laser tube having at least one integrated laser mirror with a polarizing layer applied thereto so that no additional polarizing means is required. In preferred embodiments, the polarizing layer is vapor deposited or etched from an oblique angle, such as 80° from perpendicular, so that a wave-shaped or ripple shaped surface results having parallel deformations.

Although other modifications and changes may be suggested by those skilled in the art, it is the intention of the inventors to embody within the patent warranted hereon all changes and modifications as reasonably and properly come within the scope of their contribution to the art.

We claim:

1. In a laser tube for use in a laser, the improvement comprising:
   two laser mirrors;
   means for integrally connecting said laser mirrors to a laser tube to form a housing, said connecting means including a metal flange connecting one of said mirrors to said laser tube; and
   at least one means for polarizing said laser emission, said polarizing means comprising at least one polarizing layer arranged on one of said laser mirrors, said polarizing layer being produced by oblique evaporation and serving as both a reflective layer and a polarizing layer, on said one laser mirror, said oblique evaporation being carried out at an angle of at least 80 degrees to a surface normal of said mirror to produce said surface.

2. In a laser tube for use in laser, the improvement comprising:
   two laser mirrors;
   means for connecting said laser mirrors to a laser tube to form a housing;
   at least one means for polarizing said laser emission, said polarizing means comprising at least one polarizing layer arranged on one of said laser mirrors; said polarizing means is a layer that is vapor deposited obliquely relative to a surface normal on one of said laser mirrors.

3. A laser tube as claimed in claim 2, wherein said obliquely vapor deposited layer is a metal layer.

4. A laser tube as claimed in claim 2, wherein said obliquely vapor deposited layer is a dielectric layer.

5. A laser tube as claimed in claim 2 wherein said obliquely vapor deposited layer is vapor deposited at an angle of at least 80 degrees relative to a surface normal of said one of said laser mirrors.

6. A laser tube as claimed in claim 2, wherein said one of said laser mirrors provided with said at least one polarizing layer has a quadrilateral mirror surface, a shape of said mirror surface identifying a polarization direction of said at least one polarizing layer.

7. A laser tube as claimed in claim 6, wherein said mirror is rectangular.

8. A laser tube as claimed in claim 2, further comprising a mirror mount to which a face side of said one of said laser mirrors having said at least one polarizing layer is soldered.

9. A laser tube as claimed in claim 2, further comprising a mirror mount to which a face side of said one of said laser mirrors having said at least one polarizing layer is glued.

10. A laser tube as claimed in claim 2, wherein a first of said two laser mirrors is a fully reflecting mirror carrying said at least one polarizing layer, and further comprising a metal plate soldered to a backside of said first mirror.

11. A laser tube as claimed in claim 10, further comprising:
a mirror mount having an opening;
said first mirror being smaller than an opening in said mirror mount and being inserted into said mirror mount, said metal plate being soldered to said mirror mount.

12. A laser tube as claimed in claim 2, wherein said one of said laser mirrors has a solder region coated with a solderable metal, a beam passage region of said mirror being free of said solder region, and further comprising: a mirror mount having a face side soldered onto said solder region.

13. A laser tube as claimed in claim 12, wherein said mirror mount is composed essentially of a drawn copper tube.

14. A laser tube as claimed in calim 3 wherein said obliquely vapor deposited layer is said metal layer having a thickness of at most approximately 10 nanometers.

15. A laser tube as claimed in claim 4, wherein said dielectric obliquely vapor deposited layer $\lambda$has a thickness of approximately $\lambda/2$ of a desired laser wavelength.

16. A laser tube as claimed in claim 2, wherein said obliquely vapor deposited layer is a dichroitic layer having a thickness in the range of approximately 2 nanometers through 10 nanometers.

17. A laser tube as claimed in claim 2, wherein said polarizing means is a groove pattern formed on a mirror surface of said one of said laser mirrors by ion etching at an angle of at least approximately 80 degrees relative to a surface normal of said mirror, said groove pattern suppressing oscillations in a direction of an E-vector by interference.

18. A laser tube as claimed in claim 2, wherein said at least one polarizing layer on said laser mirror is a metal layer having a thickness of from approximately 2 nanometers through 10 nanometers and said metal layer is separated into a strip pattern by ion etching at an angle of at least about 80 degrees.

19. A laser tube as claimed in claim 2, wherein said layer is a photolithographically structured metal layer arranged on said laser mirror, said photolithigraphically structured metal layer having line spacings lying in an order of magnitude of the desired laser wavelength.

* * * * *